United States Patent [19]

Iwasyk et al.

[11] Patent Number: 4,477,271
[45] Date of Patent: Oct. 16, 1984

[54] MODIFIED NOZZLES FOR POLYMER FINISHERS

[75] Inventors: John M Iwasyk, Wilmington; Robert D. Sauerbrunn, Seaford, both of Del.

[73] Assignee: E. I. Du Pont de Nemours and Company, Wilmington, Del.

[21] Appl. No.: 492,744

[22] Filed: May 9, 1983

Related U.S. Application Data

[63] Continuation-in-part of Ser. No. 283,845, Jul. 17, 1981, abandoned.

[51] Int. Cl.³ .............................................. B01D 45/08
[52] U.S. Cl. ........................................ 55/416; 55/457; 210/304; 261/79 A; 138/37; 425/203
[58] Field of Search ........................ 55/456, 416, 457; 261/79 A; 210/304; 366/76, 77, 339; 239/466, 469; 425/203, 204; 264/101, 102; 138/37, 38; 165/109

[56] References Cited

U.S. PATENT DOCUMENTS

| | | |
|---|---|---|
| 1,867,933 | 7/1932 | Wilton ............................... 261/79 A |
| 2,315,226 | 3/1943 | Rohlin .................................. 55/456 |
| 2,519,618 | 8/1950 | Wilson et al. ..................... 261/79 A |
| 3,423,294 | 1/1969 | Sephton ............................... 55/456 |
| 4,038,056 | 7/1977 | Drachuk et al. ....................... 55/456 |
| 4,090,261 | 5/1978 | Iwasyk ................................. 366/83 |
| 4,179,222 | 12/1979 | Strom et al. .......................... 138/38 |

FOREIGN PATENT DOCUMENTS

| | | | |
|---|---|---|---|
| 477906 | 2/1953 | Italy ..................................... 55/457 |
| 884750 | 12/1961 | United Kingdom ................... 55/456 |

Primary Examiner—Richard V. Fisher
Assistant Examiner—John W. Czaja

[57] ABSTRACT

An apparatus for separating entrained matter from a flowing fluid carrying the entrained matter includes a passage diverging at an angle of from 3 to about 20 degrees in the direction of flow of the fluid and at least one helical flight having the same twist direction throughout located with the passage and tapered to conform thereto. A straight cylindrical pipe is attached to the outlet end of the passage; the pipe contains a straight baffle interlocking to about 90 degrees with the helical flight. Opposed edges of the flight may be spaced from or in contact with the wall of the diverging passage.

12 Claims, 5 Drawing Figures

MODIFIED NOZZLES FOR POLYMER FINISHERS

This application is a continuation-in-part of our copending application Ser. No. 283,845 filed July 17, 1981, now abandoned.

BACKGROUND OF THE INVENTION

The invention relates to a polymerization apparatus for finishing high viscosity synthetic condensation polymers, more particularly it relates to an apparatus for reducing entrained matter in by-product gases entering the finisher.

U.S. Pat. No. 4,090,261 to Iwasyk describes a separator-finisher apparatus suitable for use in the production of synthetic condensation polymers such as polyamides and polyesters. The apparatus disclosed in the patent is an enclosed vessel with a top plate having a vent opening and at least one polymer supply passage. The disclosure of the Iwasyk patent is incorporated herein by reference. When such an apparatus is used for the preparation of polyamides, thermal degradation and gelation tend to occur in stagnant regions of the processing vessel such as when generated molten polymer particles (aerosols) deposit on conduit surfaces above the vent opening and drain by gravity to the vent edge, form stalactites at the vent edge and dangle into the process space. These stalactites periodically break off to discharge degraded material contaminating the process melt pool below.

SUMMARY OF THE INVENTION

The present invention provides a means for reducing this deposition of polymer on stagnant areas by reducing the aerosol content of the steam entering the finisher and involves modifying the polymer supply passage to the vessel by locating at least one helical flight having the same twist direction throughout, in and extending longitudinally of the passage. The passage diverges from its inlet to its outlet at an included angle A of from about 3 to about 20 degrees and the helical flight is tapered to conform to the divergence of the passage. One modification of the concept of this invention has been the addition of a constant-diameter pipe to the exit of the polymer supply passage. The pipe contains a straight baffle element with a length to diameter ratio equivalent to the exit helical flight.

DETAILED DESCRIPTION OF THE ILLUSTRATED EMBODIMENTS

Figure 1:
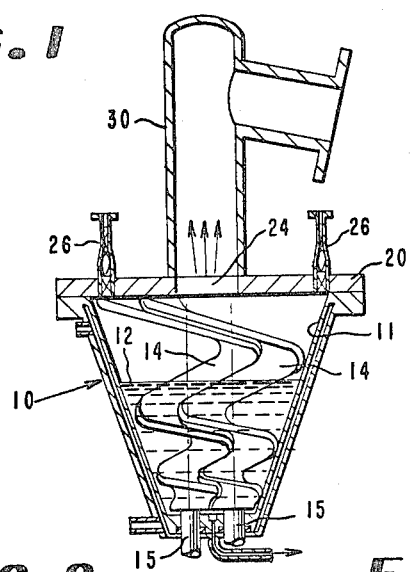
FIG. 1 is a vertical sectional view of one embodiment of a vessel utilizing the apparatus of this invention.

Referring to FIG. 1, vessel 10, containing a polymer melt 12 is in the shape of two intersecting conical frustums and has an interior wall surface 11. Two co-rotating interengaging helical screw elements 14 are supported on shafts 15. Top plate 20 contains a vent opening 24 and a pair of polymer supply passages 26. Connected to vent opening 24 is a heated duct 30 for connecting vessel 10 to an appropriate condenser system (not shown). Each polymer supply passage has an inlet and an outlet end, i.e., 26a, 26b respectively. The polymer supply passages diverge from their inlet to their outlet at an angle of from about 3 to about 20 degrees.

Figure 2:
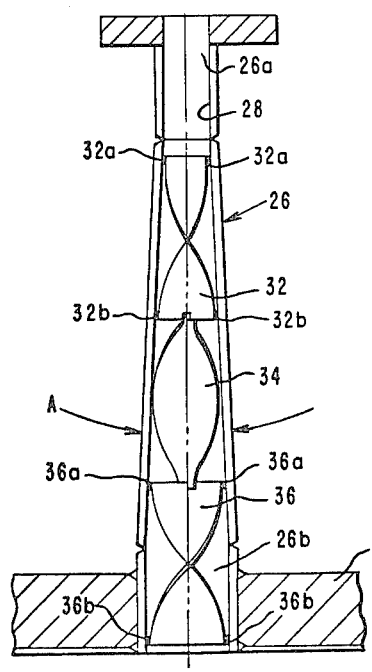
FIG. 2 is an enlarged view of one of the inlets of FIG. 1.

As best shown in FIG. 2, a plurality of helical flights 32, 34, 36 with the same twist direction are located and extend longitudinally in polymer supply passage 26. The flights are oriented at 90 degrees to each other, are interlocked with each other by means of notches in the leading and trailing edges of the flights, and have opposed edges running longitudinally of the passage 26 which are slightly spaced from the wall 28 of the polymer passage 26 by spacers 32a, 32b, and 36a, 36b. The gap thus provided allows liquid to flush any stagnant areas between the wall 28 of the passage 26 and the flights therein. The gap thickness should be less than the flowing-liquid film thickness. As can be readily seen from the drawing, the helical flights are tapered to conform to the divergence angle A of the passage. Additionally, the flights may be secured to each other at their interlocking portions by soldering, tack-welding, or brazing. The total angle of twist of the flights 32, 34, 36 should be greater than 360 degrees and preferably between 360 degrees and 540 degrees while the individual pitch of each flight should be between 18 and 28 degrees per inch with a total twist per each flight of equal to or greater than 90 degrees, preferably from 90 to 180 degrees.

Figure 3:
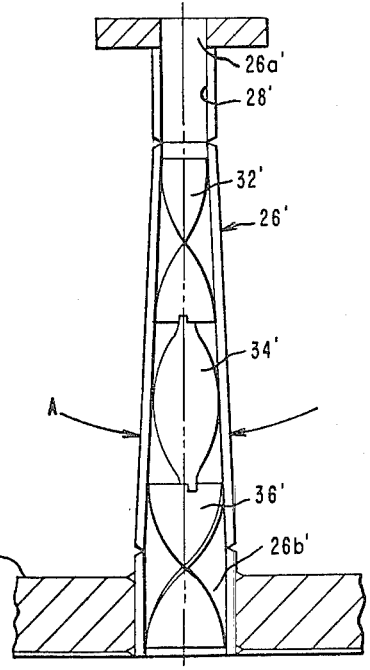
FIG. 3 is an alternate embodiment for an inlet useful with a vessel as shown in FIG. 1.

In an alternate embodiment shown in FIG. 3, the flights 32', 34', 36', are located longitudinally in passage 26' but in this case the opposed edges of the flights are in contact with the wall 28' of the passage 26'. Except for being in contact with the wall of the passage 26' all other parameters for the flights as described above in connection with FIG. 2 apply.

In operation, two phases, a liquid polymer and steam are flowing through polymer inlet passages 26 in such a manner that the viscous polymer flow path is around the steam core. While the liquid flow is not affected by the helical flights in the passages 26, the entrained liquid (aerosols) in the steam impinges on the surface of the flights at initial velocities above 80 feet per second. The helical flights 32, 34, 36 being oriented 90 degrees with respect to each other divide the flow into separate streams as it moves through passage 26. The aerosols entrained in the steam impact on the surface of the flights and are collected as a liquid which flows into the vessel. The divergence of passage 26 is important because this reduces the velocity of the steam flowing through the passage to a level less than 70 ft/sec (21.3 m/sec) where reentrainment of polymer and atomization at the nozzle exit are significantly reduced.

In a series of test runs using equipment similar to that illustrated in the drawing the exit (26b) aerosol entrainment was reduced by an amount of from 30 percent to 70 percent from the inlet (26a) entrainment. However, in spite of this improvement it has been found that the helical flights impart a swirling velocity component which causes atomization at the nozzle exit and deposition of a beach line at the polymer melt 12 in the vessel 10. This deposition increases as polymer throughput increases.

Figure 4:
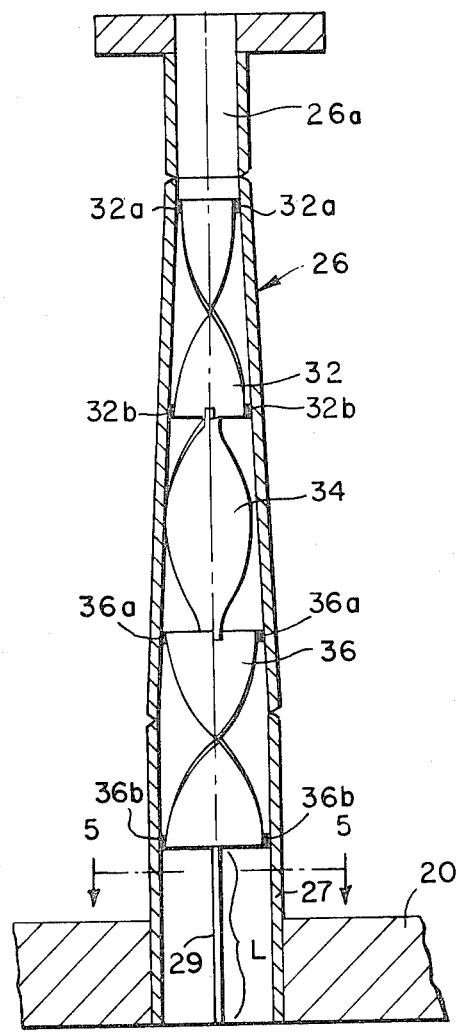
FIG. 4 is an enlarged view of a modification to the inlets shown in FIGS. 2 and 3.
Figure 5:
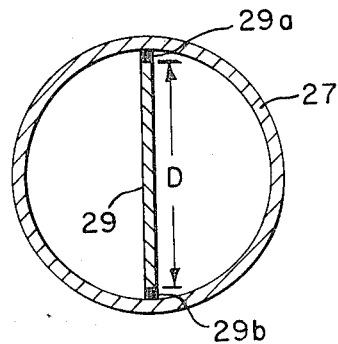
FIG. 5 is a view of FIG. 4 taken along 5—5.

One modification of the concept of this invention, shown in FIGS. 4 and 5, has been the addition of a constant-diameter pipe 27 of diameter equal to the exit diameter of the diverging passage. This straight cylindrical section 27 contains a straight baffle element 29 with a length to diameter ratio (L/D) equivalent to L/D of helical flight (36) with D of the helical flight measured at its exit which is adjacent to the flat baffle. The opposed edges of the straight baffle 29 are slightly spaced from the wall of the straight cylindrical section 27 by means of spacers 29a and 29b in the same manner and for the same purpose as helical flights above. The straight baffle 29 may be placed in an interlocking relationship in line with the exit edge of helical flight 36 but preferably the baffle 29 is at 90 degrees to the final helical flight 36 as shown in FIGS. 4 and 5. This baffle arrangement reduces the swirling velocity component which in turn reduces polymer deposition at the beach line of the polymer melt 12 (FIG. 1).

What is claimed is:

1. In an apparatus for separating entrained matter from a flowing fluid carrying the entrained matter that includes a continuous impervious wall forming a passage through which the entrained matter along with the fluid passes, said passage having an inlet end and an outlet end and at least one helical flight having the same twist direction throughout located in and extending longitudinally of said passage, the improvement comprising: said passage diverging from said inlet to said outlet at an angle of from about 3 degrees to about 20 degrees, said helical flight being tapered to conform to the divergence of said passage; and a straight cylindrical pipe attached to the outlet end of said passage, said pipe having a diameter equal to the diameter of the outlet end of said passage, said pipe containing a straight baffle element interlocking with the helical flight and oriented about 90 degrees thereto.

2. The apparatus as defined in claim 1, said helical flight being stationary and having opposed edges in contact with the wall of said passage.

3. The apparatus as defined in claim 1, said helical flight being stationary and having opposed edges, and wherein portions of said opposed edges are spaced from the wall of said passage.

4. The apparatus as defined in claim 1, said helical flight having a total angle of twist greater than 360 degrees.

5. The apparatus as defined in claim 1, said helical flight having a pitch of from about 18 degrees to about 28 degrees per inch of length.

6. The apparatus as defined in claim 1, said passage diverging from said inlet to said outlet at an angle of about 8 degrees.

7. The apparatus as defined in claim 1, said helical flight being a plurality of stationary, contiguous helical flights each having a leading edge and a trailing edge, and wherein the trailing edge of one flight is oriented about 90 degrees to the leading edge of an adjacent helical flight.

8. The apparatus as defined in claim 7, each flight having opposed longitudinal edges and wherein said opposed longitudinal edges of each flight are in contact with the wall of said passage.

9. The apparatus as defined in claim 7, each flight having opposed longitudinal edges and wherein a portion of the opposed longitudinal edges of each flight are spaced from the wall of said passage.

10. The apparatus as defined in claim 7, each helical flight having from about 90 degrees to about 180 degrees twist.

11. In an apparatus for finishing synthetic polymer including an enclosed vessel, a vent and at least one polymer inlet in the upper portion of said vessel and a discharge outlet in the lower portion of said vessel, said inlet being defined by a continuous impervious wall forming a passage diverging toward said vessel, the improvment comprising: a plurality of stationary, contiguous, helical flights with adjacent flights having the same twist direction positioned in each of said polymer inlets, said flights being tapered to conform to the divergence of said passage, and having a total twist greater than about 360 degrees; and a straight cylindrical pipe attached to the outlet end of said passage, said pipe having a diameter equal to the diameter of the outlet end of said passage, said pipe containing a straight baffle element interlocking with the helical flight and oriented about 90 degrees thereto.

12. The apparatus as defined in claim 11, each helical flight having a leading edge and a trailing edge, the same twist direction with from about 120 degrees to about 180 degrees twist, and wherein the trailing edge of one helical flight is oriented about 90 degrees relative to the leading edge of an adjacent helical flight.

* * * * *